(12) United States Patent
Yang et al.

(10) Patent No.: US 11,271,404 B2
(45) Date of Patent: Mar. 8, 2022

(54) PHOTOVOLTAIC POWER OPTIMIZER AND METHOD AND APPARATUS FOR CONTROLLING SAME, AND PHOTOVOLTAIC POWER GENERATION SYSTEM

(71) Applicant: HUAWEI TECHNOLOGIES CO., LTD., Guangdong (CN)

(72) Inventors: Feng Yang, Shenzhen (CN); Chengyong Liu, Shenzhen (CN); Chengfeng Jiang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 16/793,252

(22) Filed: Feb. 18, 2020

(65) Prior Publication Data

US 2020/0185923 A1   Jun. 11, 2020

Related U.S. Application Data

(63) Continuation of application No. PCT/CN2018/103748, filed on Sep. 3, 2018.

(30) Foreign Application Priority Data

Sep. 15, 2017   (CN) .......................... 201710834910.3

(51) Int. Cl.
*H02J 3/38* (2006.01)
*H02M 3/158* (2006.01)
*H02M 1/32* (2007.01)

(52) U.S. Cl.
CPC ............ *H02J 3/381* (2013.01); *H02J 2300/26* (2020.01); *H02M 1/32* (2013.01); *H02M 3/158* (2013.01)

(58) Field of Classification Search
CPC ............ H02J 3/381; H02J 2300/22–26; H02S 40/30–38; H02S 50/00; H02M 1/32–348
See application file for complete search history.

(56) References Cited

U.S. PATENT DOCUMENTS

| 2009/0284232 A1* | 11/2009 | Zhang | H02J 3/385 |
| | | | 322/89 |
| 2010/0295381 A1* | 11/2010 | Burger | H02J 3/381 |
| | | | 307/126 |

(Continued)

FOREIGN PATENT DOCUMENTS

| CN | 102291052 A | 12/2011 |
| CN | 103138377 A | 6/2013 |

(Continued)

OTHER PUBLICATIONS

SM72442 Texas Instruments,"Programmable Maximum Power Point Tracking Controller for Photovoltaic Solar Panels",SNVS689H—Oct. 2010—Revised Apr. 2013. (22 pages).

(Continued)

*Primary Examiner* — Hal Kaplan
*Assistant Examiner* — David A Shiao
(74) *Attorney, Agent, or Firm* — Westerman, Hattori, Daniels & Adrian, LLP (57) ABSTRACT

This application provides a photovoltaic power optimizer and a method and apparatus for controlling same, and a photovoltaic power generation system. The photovoltaic power optimizer includes: a power optimization module, a bypass module, and a control module, where the bypass module is connected to an input end of the power optimization module, an output end of the power optimization module, and the control module, and the control module is connected to the power optimization module; and when detecting that the power optimization module is faulty, the control module is configured to control the bypass module to (Continued)

be on, to bypass the faulty power optimization module, so that the photovoltaic battery component can be directly connected to other battery groups in the photovoltaic power generation system, and connected to an inverter.

19 Claims, 6 Drawing Sheets

(56) References Cited

U.S. PATENT DOCUMENTS

| | | | |
|---|---|---|---|
| 2011/0285375 | A1 | 11/2011 | Deboy |
| 2012/0043818 | A1* | 2/2012 | Stratakos ............... H02M 3/158 307/77 |
| 2012/0242303 | A1* | 9/2012 | Ishii .......................... G05F 1/67 323/234 |
| 2013/0328404 | A1 | 12/2013 | Nosaka et al. |
| 2014/0159763 | A1 | 6/2014 | Luo et al. |
| 2016/0105028 | A1* | 4/2016 | Caraglio ................. H02M 7/44 307/78 |
| 2016/0248352 | A1* | 8/2016 | Shinomoto .......... H02H 7/1255 |
| 2017/0133857 | A1* | 5/2017 | Sun ......................... H02M 7/48 |
| 2019/0178728 | A1* | 6/2019 | Kawaguchi ........ H05K 7/20927 |

FOREIGN PATENT DOCUMENTS

| | | |
|---|---|---|
| CN | 104506135 A | 4/2015 |
| CN | 204928736 U | 12/2015 |
| CN | 105245104 A | 1/2016 |
| CN | 205983286 U | 2/2017 |
| CN | 107565600 A | 1/2018 |
| JP | 2010063244 A | 3/2010 |

OTHER PUBLICATIONS

Office Action dated Apr. 17, 2019, issued in counterpart CN application No. 201710834910.3, with English translation. (34 pages).

International Search Report dated Oct. 26, 2018, issued in counterpart application No. PCT/CN2018/103748, with English Translation. (12 pages).

Extended (Supplementary) European Search Report dated Apr. 3, 2020, issued in counterpart EP Application No. 18856905.7. (9 pages).

* cited by examiner

PHOTOVOLTAIC POWER OPTIMIZER AND METHOD AND APPARATUS FOR CONTROLLING SAME, AND PHOTOVOLTAIC POWER GENERATION SYSTEM

CROSS-REFERENCE TO RELATED APPLICATIONS

This application is a continuation of International Application No. PCT/CN2018/103748, filed on Sep. 3, 2018, which claims priority to Chinese Patent Application No. 201710834910.3, filed on Sep. 15, 2017, the disclosures of the aforementioned applications are hereby incorporated by reference in their entireties.

TECHNICAL FIELD

This application relates to the field of photovoltaic power generation, and in particular, to a photovoltaic power optimizer and a method and apparatus for controlling same, and a photovoltaic power generation system.

BACKGROUND

A photovoltaic power optimizer is a device in a photovoltaic power generation system and is configured to optimize power output by a photovoltaic battery component, to ensure maximization of power output by the photovoltaic power generation system.

In the related art, the photovoltaic power generation system usually includes a plurality of serially-connected battery groups, and each battery group includes a photovoltaic (PV) battery component and a photovoltaic power optimizer connected to the photovoltaic battery component. The plurality of serially-connected battery groups are connected to an input end of an inverter, and an output end of the inverter is connected to a power supply network. Each photovoltaic power optimizer usually includes a power optimization module and a control module. The control module can control the power optimization module to perform maximum power point tracking (Maximum Power Point Tracking, MPPT) on the photovoltaic battery component, so that the photovoltaic battery component outputs maximum power, thereby effectively improving power generation efficiency of the entire photovoltaic power generation system.

However, when a photovoltaic power optimizer to which a photovoltaic battery component is connected is faulty, even if the photovoltaic battery component can work normally, the photovoltaic battery component cannot output generated power, and a waste of power is easily caused.

SUMMARY

This application provides a photovoltaic power optimizer and a method and apparatus for controlling same, and a photovoltaic power generation system, to resolve a problem that in the related art, when a photovoltaic power optimizer is faulty, a waste of power is easily caused. Technical solutions are as follows:

According to a first aspect, a photovoltaic power optimizer is provided. The photovoltaic power optimizer may include: a power optimization module, a bypass module, and a control module. An input end of the power optimization module is connected to a photovoltaic battery component, an output end of the power optimization module is connected to an inverter, and the power optimization module is configured to optimize power output by the photovoltaic battery component; the bypass module is connected to the input end of the power optimization module, the output end of the power optimization module, and the control module, and the control module is further connected to the power optimization module; and the control module is configured to control the bypass module to be on when detecting that the power optimization module is faulty.

When detecting that the power optimization module is faulty, the control module can cause the bypass module to be on, to bypass the faulty power optimization module, so that power generated by the photovoltaic battery component can be effectively output, thereby avoiding a waste of power caused by the faulty power optimization module.

In an optional implementation, the bypass module may include a transistor; and a gate of the transistor is connected to the control module, a first electrode of the transistor is connected to the input end of the power optimization module, and a second electrode of the transistor is connected to the output end of the power optimization module.

Optionally, the transistor may be a metal-oxide semiconductor field-effect transistor (Metal-Oxide Semiconductor Field-Effect Transistor, MOSFET), and the MOSFET includes a switch transistor and a parasitic diode connected to the switch transistor in parallel. When there is a voltage difference between the input end and the output end of the power optimization module, even if the control module controls the switch transistor in the MOSFET to be off, the parasitic diode may be on. As a result, the power optimization module may be bypassed during normal work. Therefore, the bypass module may further include a diode serially connected to the transistor. Conduction directions of the diode and the parasitic diode in the MOSFET are opposite. Therefore, it can be ensured that when the control module controls the switch transistor in the MOSFET to be off, the input end and the output end of the power optimization module may not be on by using the diode in the bypass module, thereby ensuring normal work of the power optimization module.

In another optional implementation, the bypass module may include a plurality of serially-connected transistors; a gate of each transistor is connected to the control module; in the plurality of transistors, a first electrode of a first transistor is connected to the input end of the power optimization module, and a second electrode of a second transistor is connected to the output end of the power optimization module; and the first transistor and the second transistor are transistors located at two ends of the at least two serially-connected transistors.

Optionally, each of the plurality of serially-connected transistors may be a MOSFET, and conduction directions of parasitic diodes in at least two of the plurality of transistors are opposite. Therefore, it can be ensured that when the switch transistor in the MOSFET is not on, the input end and the output end of the power optimization module are not on by using the diode in the bypass module.

Optionally, after the bypass module is caused to be on, the control module may further be configured to detect whether an input voltage of the photovoltaic battery component is less than a preset low voltage threshold; and when the input voltage of the photovoltaic battery component is less than the preset low voltage threshold, the control module may determine that the photovoltaic battery component cannot output power normally, and therefore, may control the bypass module to be off.

Optionally, the power optimization module may include a voltage step-down component and a voltage step-up component; the voltage step-down component includes a voltage step-down chip and two transistors; and the voltage step-up component includes a voltage step-up chip and two transistors.

The control module may further be configured to: when detecting that any transistor in the voltage step-down component is short-circuited, turn off the other transistor in the voltage step-down component; and when detecting that any transistor in the voltage step-up component is short-circuited, turn off the other transistor in the voltage step-up component. After any transistor in the voltage step-up component or the voltage step-down component is short-circuited, impact may be caused on other devices in the module. In this case, turning off the other transistor in time can avoid the impact caused by the short-circuited transistor on the other devices, and avoid diffusion of the short circuit fault.

Optionally, the photovoltaic power optimizer may further include a host computer; and the control module establishes a communication connection with the host computer, and the control module is configured to: send a bypass channel switching request to the host computer when detecting that the power optimization module is faulty; and control the bypass module to be on when receiving a switching instruction sent by the host computer.

In the photovoltaic power optimizer provided in this application, when detecting that the power optimization module is faulty, the control module can cause the bypass module to be on, to bypass the faulty power optimization module, so that power generated by the photovoltaic battery component can be effectively output, thereby avoiding a waste of power caused by the faulty power optimization module.

According to a second aspect, a method for controlling a photovoltaic power optimizer is provided. The method is used to control the photovoltaic power optimizer according to the first aspect, and the method may include:

detecting whether a power optimization module is faulty; and controlling a bypass module to be on when detecting that the power optimization module is faulty.

In an optional implementation, the detecting whether a power optimization module is faulty may include:

counting a quantity of times of overcurrent protection and a quantity of times of backflow current protection triggered in a unit time segment; and determining that the power optimization module is faulty when detecting that the quantity of times of overcurrent protection triggered in the unit time segment is greater than a first threshold, or the quantity of times of backflow current protection triggered in the unit time segment is greater than a second threshold.

In another optional implementation, the detecting whether a power optimization module is faulty may include:

obtaining a detection parameter and an output parameter of the power optimization module, where the detection parameter includes output voltages collected by at least two voltage detection components and temperatures collected by at least two temperature sensors; and determining that the power optimization module is faulty when detecting that a voltage difference of output voltages collected by any two voltage detection components is greater than a preset voltage difference threshold, or when detecting that a temperature difference of temperatures collected by any two temperature sensors is greater than a preset temperature difference threshold, or when detecting that lasting duration for which the output parameter of the power optimization module does not satisfy a normal output condition exceeds a preset duration threshold.

Optionally, the process of controlling a bypass module to be on when detecting that the power optimization module is faulty may include:

when detecting that the power optimization module is faulty, detecting whether an input voltage of the photovoltaic battery component falls within a rated voltage range. When the input voltage of the photovoltaic battery component falls within the rated voltage range, the control module may determine that the photovoltaic battery component can work normally and may control the bypass module to be on, to avoid a waste of power.

Further, when the input voltage of the photovoltaic battery component is greater than an upper limit value of the rated voltage range, to avoid that devices in the bypass module are damaged in a high-temperature and high-voltage environment, the control module may continue to detect whether a temperature of the power optimization module is less than a preset high temperature threshold. When the temperature of the power optimization module is less than the preset high temperature threshold, the control module may determine that the devices in the bypass module can work normally in the current temperature condition, and therefore, may control the bypass module to be on.

Optionally, after the controlling the bypass module to be on, the method may further include:

detecting whether an input voltage of the photovoltaic battery component is less than a preset low voltage threshold; and when the input voltage of the photovoltaic battery component is less than the preset low voltage threshold, the control module may determine that the photovoltaic battery component cannot output power normally, and therefore, may control the bypass module to be off, where the preset low voltage threshold may be less than a lower limit value of the rated voltage range.

Optionally, when the control module detects that in a preset time segment, a quantity of times of controlling the bypass module to be on/off is greater than a preset quantity-of-times threshold, the control module may wait for preset duration and then determine whether to cause the bypass module to be on, to prevent the devices in the bypass module from being damaged due to frequent on/off of the bypass module.

Optionally, the process of controlling, by the control module, a bypass module to be on when detecting that the power optimization module is faulty may include: sending a bypass channel switching request to a host computer when detecting that the power optimization module is faulty; and controlling the bypass module to be on when receiving a switching instruction sent by the host computer.

According to a third aspect, an apparatus for controlling a photovoltaic power optimizer is provided. The apparatus includes at least one module, and the at least one module may be configured to implement the method for controlling a photovoltaic power optimizer according to the second aspect.

According to a fourth aspect, a computer-readable storage medium is provided. The computer-readable storage medium stores an instruction, and when the computer-readable storage medium is run on a computer, the computer is enabled to perform the method for controlling a photovoltaic power optimizer according to the second aspect.

According to a fifth aspect, a photovoltaic power generation system is provided. The system includes a plurality of serially-connected battery groups. Each battery group includes a photovoltaic battery component and a photovoltaic power optimizer connected to the photovoltaic battery component, and the photovoltaic power optimizer is the photovoltaic power optimizer according to the first aspect.

Technical effects obtained in the second to the fifth aspects of the embodiments of the present invention are similar to technical effects obtained by the technical means corresponding to the first aspect, and details are not described herein again.

In conclusion, the embodiments of the present invention provide the photovoltaic power optimizer and the method and apparatus for controlling same, and the photovoltaic power generation system. When detecting that the power optimization module is faulty, the control module in the photovoltaic power optimizer can cause the bypass module to be on, to bypass the faulty power optimization module, so that the photovoltaic battery component can be directly serially connected to other battery groups in the photovoltaic power generation system, and connected to the inverter. In this way, power generated by the photovoltaic battery component can be effectively output, thereby avoiding a waste of power caused by the faulty power optimization module.

DESCRIPTION OF EMBODIMENTS

Figure 1:
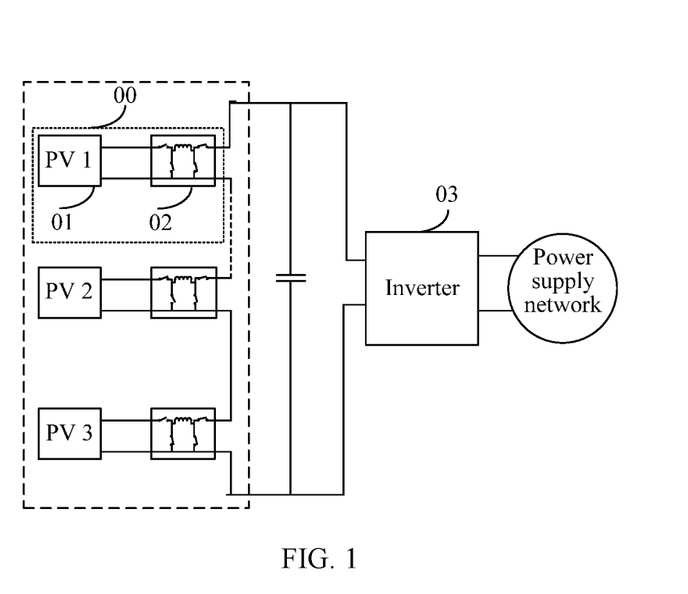
FIG. 1 is a schematic structural diagram of a photovoltaic power generation system according to an embodiment of the present invention.

FIG. 1 is a schematic structural diagram of a photovoltaic power generation system according to an embodiment of the present invention. Referring to FIG. 1, the photovoltaic power generation system may include a plurality of serially-connected battery groups 00, and each battery group 00 may include a photovoltaic battery component 01 and a photovoltaic power optimizer 02 connected to the photovoltaic battery component 01. The plurality of serially-connected battery groups 00 are connected to an input end of an inverter 03, and an output end of the inverter 03 is connected to a power supply network. When a photovoltaic power optimizer connected to a photovoltaic battery component is faulty, power generated by the photovoltaic battery component cannot be output, causing a waste of power.

In the related art, the working personnel periodically detects working statuses of various components in the photovoltaic power generation system, and when detecting a faulty photovoltaic power optimizer, the working personnel may repair or replace the photovoltaic power optimizer. Due to a limit on a detection and repairing period, according to the method, the faulty photovoltaic power optimizer cannot be detected in time, and a waste of power is still caused.

Figure 2:
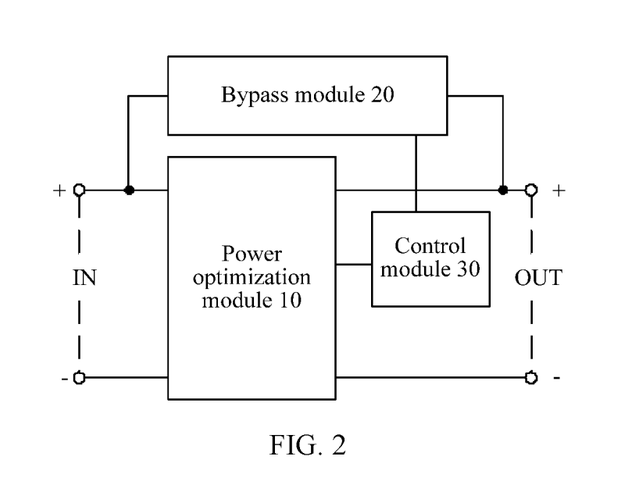
FIG. 2 is a schematic structural diagram of a photovoltaic power optimizer according to an embodiment of the present invention.

FIG. 2 is a schematic structural diagram of a photovoltaic power optimizer according to an embodiment of the present invention. The photovoltaic power optimizer may be applied to the system shown in FIG. 1. Referring to FIG. 2, the photovoltaic power optimizer may include: a power optimization module 10, a bypass module 20, and a control module 30.

An input end IN of the power optimization module 10 is connected to a photovoltaic battery component (not shown in FIG. 2), an output end OUT of the power optimization module 10 is connected to an inverter (not shown in FIG. 2), and the power optimization module 10 is configured to optimize power output by the photovoltaic battery component.

The input end of the power optimization module 10 is an input end of the photovoltaic power optimizer, and the output end of the power optimization module 10 is an output end of the photovoltaic power optimizer. Referring to FIG. 1, it may be learned that the output end of the photovoltaic power optimizer may be serially connected to other battery groups in the photovoltaic power generation system and then connected to the inverter.

Still referring to FIG. 2, the bypass module 20 may be connected to the input end of the power optimization module 10, the output end of the power optimization module 10, and the control module 30. An initial state of the bypass module 20 is an OFF state, and the power output by the photovoltaic battery component needs to be optimized by the power optimization module 10 before being output to the inverter.

The control module 30 is further connected to the power optimization module 10, and the control module 30 is configured to control the bypass module 20 to be on when detecting that the power optimization module 10 is faulty, so that the photovoltaic battery component can be directly serially connected to the other battery groups in the photovoltaic power generation system, and connected to the inverter, thereby ensuring that the photovoltaic battery component can still output a part of the power.

In conclusion, this embodiment of the present invention provides the photovoltaic power optimizer. When detecting that the power optimization module is faulty, the control module in the photovoltaic power optimizer can cause the bypass module to be on, to bypass the faulty power optimization module, so that the photovoltaic battery component can be directly serially connected to the other battery groups in the photovoltaic power generation system, and connected to the inverter. In this way, power generated by the photovoltaic battery component can be effectively output, thereby avoiding a waste of power caused by the faulty power optimization module. In addition, although the power optimization module cannot perform MPPT on the photovoltaic battery component after a bypass channel is on, if a current lighting condition is desirable, and performance of the photovoltaic battery component is also desirable, the photovoltaic battery component can still generate 90% of the power, thereby significantly improving a power generation amount of the photovoltaic power generation system.

Figure 3:
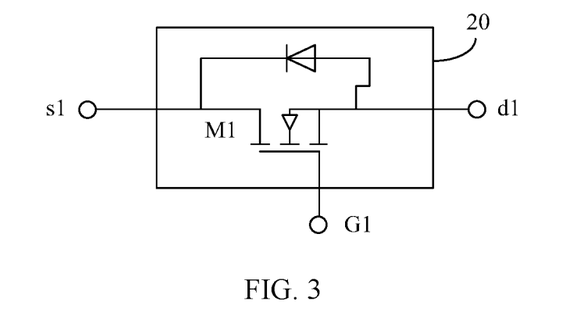
FIG. 3 is a schematic structural diagram of a bypass module according to an embodiment of the present invention.

FIG. 3 is a schematic structural diagram of a bypass module according to an embodiment of the present invention. As shown in FIG. 3, the bypass module 20 may include a transistor M1.

A gate G1 of the transistor M1 is connected to a control module 30, a first electrode s1 is connected to an input end of a power optimization module 10, and a second electrode d1 is connected to an output end of the power optimization module 10.

Figure 4:
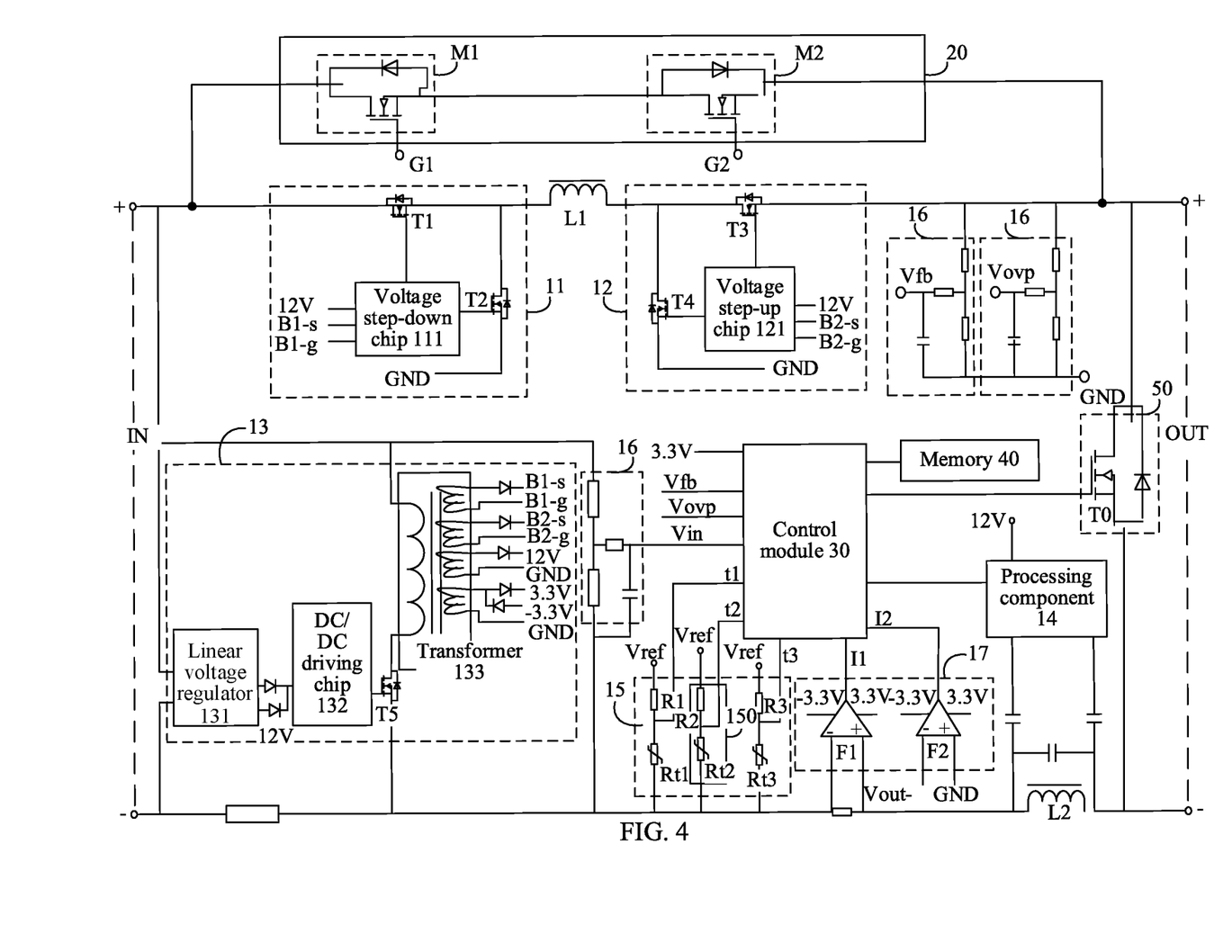
FIG. 4 is a schematic structural diagram of another photovoltaic power optimizer according to an embodiment of the present invention.

Optionally, the bypass module 20 may further include a plurality of serially-connected transistors. FIG. 4 is a schematic structural diagram of another photovoltaic power optimizer according to an embodiment of the present invention. As shown in FIG. 4, the bypass module 20 may include two serially-connected transistors M1 and M2.

A gate of each transistor is connected to the control module 30; in the plurality of transistors, a first electrode of a first transistor is connected to the input end IN of the power optimization module 10, a second electrode of a second transistor is connected to the output end OUT of the power optimization module 10, and a second electrode of each of the other transistors is connected to a first electrode of a neighboring transistor; and the first transistor and the second transistor are transistors located at two ends of the at least two serially-connected transistors.

For example, as shown in FIG. 4, the first electrode of the first transistor M1 may be connected to the input end IN of the power optimization module 10, a second electrode of the first transistor M1 is connected to a first electrode of the second transistor M2, the second electrode of the second transistor M2 is connected to the output end OUT of the power optimization module 10, and a gate G1 of the first transistor M1 and a gate G2 of the second transistor M2 are connected to the control module 30.

In this embodiment of the present invention, the control module 30 may provide a drive signal for the gate of each transistor in the bypass module 20, and may control the bypass module 20 to be on or off by adjusting a value of a level of the drive signal. For example, if the transistor in the bypass module 20 is a P-type transistor, when the drive signal provided by the control module 30 is at a low level, the transistor in the bypass module 20 is turned on, and the bypass module 20 is on. If the transistor in the bypass module 20 is an N-type transistor, when the drive signal provided by the control module 30 is at a high level, the transistor in the bypass module 20 is turned on, and the bypass module 20 is on.

Further, in this embodiment of the present invention, the transistor used in the bypass module 20 may be a MOSFET. It may be learned from FIG. 3 and FIG. 4 that, each MOSFET may include a switch transistor and a parasitic diode connected to the switch transistor in parallel.

When the bypass module 20 includes a plurality of serially-connected MOSFETs, conduction directions of parasitic diodes in at least two of the plurality of MOSFETs are opposite. Referring to FIG. 4, a parasitic diode in the transistor M1 in the bypass module 20 and a parasitic diode in the transistor M2 are connected in opposite directions, that is, the two MOSFETs are disposed opposite to each other. When the power optimization module 10 is in a normal working state and the control module 30 controls a switch transistor of each MOSFET in the bypass module 20 to be off, if a voltage of the input end IN of the photovoltaic power optimizer is higher than a voltage of the output end OUT, the parasitic diode in the transistor M2 is on, the parasitic diode in the transistor M1 is cut off, and a current cannot pass through the bypass module 20. When a voltage of the input end IN of the photovoltaic power optimizer is lower than a voltage of the output end OUT, the parasitic diode in the transistor M1 is on, the parasitic diode in the transistor M2 is cut off, and a current cannot pass through the bypass module 20. In this case, it can be ensured that the bypass module 20 always remains in an OFF state, thereby avoiding causing interference to normal work of the power optimization module 10.

Figure 5:
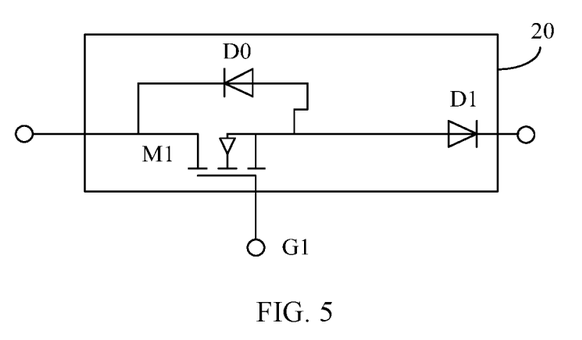
FIG. 5 is a schematic structural diagram of another bypass module according to an embodiment of the present invention.

FIG. 5 is a schematic structural diagram of another bypass module according to an embodiment of the present invention. As shown in FIG. 5, the bypass module 20 may further include a diode D1 serially connected to a transistor M1; and conduction directions of the diode D1 and a parasitic diode D0 in the transistor M1 are opposite. Therefore, it can be ensured that when a switch transistor in a MOSFET is not on, regardless of how a relative voltage across an input end and an output end of a photovoltaic power optimizer changes, the bypass module 20 can always remain in an OFF state, avoiding causing interference to normal work of a power optimization module 10.

It can be learned from FIG. 4 that, the power optimizer may further include a memory 40 and a bypass component 50. In the structure shown in FIG. 4, other components than the bypass module 20, the control module 30, the memory 40, and the bypass component 50 may belong to the power optimization module 10. Referring to FIG. 4, the power optimization module 10 may include a voltage step-down component 11, a voltage step-up component 12, a first inductor L1 disposed between the two components, a second inductor L2 serially connected between a negative input end and a negative output end of the photovoltaic power optimizer, a power supply component 13, a processing component 14, and a detection component. The detection component may include a temperature detection component 15, a voltage detection component 16, and a current detection component 17. The voltage step-down component 11 and the voltage step-up component 12 are power components in the power optimization module 10.

Figure 6:
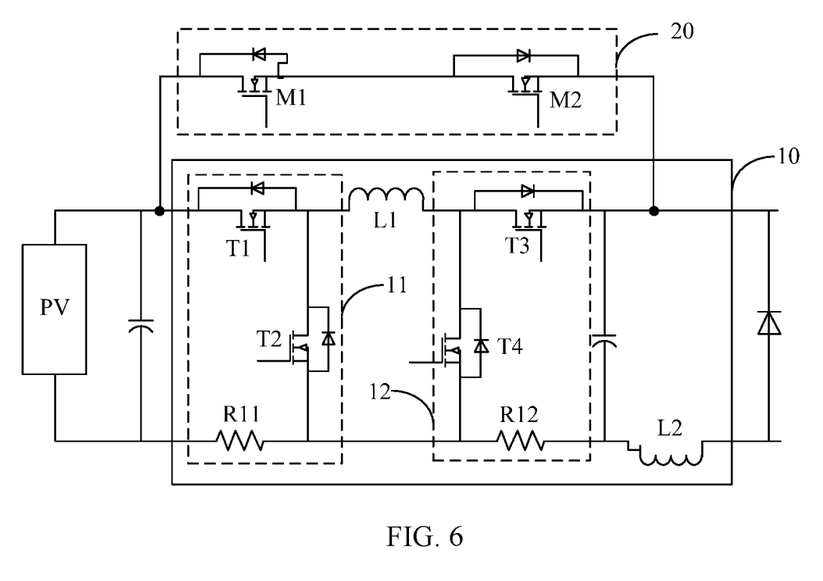
FIG. 6 is an equivalent circuit diagram of some components in a power optimization module according to an embodiment of the present invention.

FIG. 6 is an equivalent circuit diagram of some components in a power optimization module according to an embodiment of the present invention. With reference to FIG. 4 and FIG. 6, it may be learned that, the voltage step-down component 11 may include a voltage step-down chip 111 and two transistors T1 and T2. Gates of the two transistors T1 and T2 are connected to the voltage step-down chip 111, a first electrode of the transistor T1 is connected to the input end IN of the power optimization module 10, a second electrode of the transistor T1 is connected to a first electrode of the transistor T2, and a second electrode of the transistor T2 is grounded. The voltage step-up component 12 may include a voltage step-up chip 121 and two transistors T3 and T4. Gates of the two transistors T3 and T4 are connected to the voltage step-up chip 121. A first electrode of the transistor T3 is connected to the output end OUT of the power optimization module 10, a second electrode of the transistor T3 is connected to a first electrode of the transistor T4, and a second electrode of the transistor T4 is grounded.

Faults that may occur in some components of the power optimization module 10 may be shown in FIG. 1. Faults that may occur in the voltage step-down component 11 and the voltage step-up component 12 may include: a short-circuited transistor and a chip fault. Faults that may occur in the first inductor L1 and the second inductor L2 include: an open circuit and saturation. A fault that may occur in the power supply component 13 includes: no power supply. A fault that may occur in the processing component 14 and the detection component is: abnormal output.

TABLE 1

| Component | Voltage step-down component/ voltage step-up component | First inductor/ second inductor | Power supply component | Processing component/ detection component |
|---|---|---|---|---|
| Fault | Short-circuited transistor; chip fault | Open circuit; saturation | No power supply | Abnormal output |

In this embodiment of the present invention, on one hand, when a transistor in the voltage step-down component 11 is short-circuited, or when either of the first inductor L1 and the second inductor L2 is open-circuited or saturated, the control module 30 may trigger overcurrent protection. When a transistor in the voltage step-up component 12 is short-circuited, the control module 30 may trigger overcurrent protection or backflow current protection. The overcurrent protection may include periodic overcurrent protection or one-time overcurrent protection. Therefore, the control module 30 may determine whether the power optimization module 10 is faulty, based on a quantity of times of triggered overcurrent protection or a quantity of times of triggered backflow current protection.

It may be learned from FIG. 4 that, the current detection component 17 is connected to the control module 30, and the current detection component 17 may include an operational amplifier F1 and an operational amplifier F2. Two input ends of the operational amplifier F1 are connected to the negative input end of the photovoltaic power optimizer, a resistor is disposed between the two input ends of the operational amplifier F1, and the operational amplifier F1 is configured to collect an input current I1. Two input ends of the operational amplifier F2 are respectively connected to a ground (GND) cable and the negative output end Vout- of the photovoltaic power optimizer, and the operational amplifier F2 is configured to collect an output current I2.

When detecting that an input current is greater than a preset current limit threshold, the control module 30 may trigger overcurrent protection; and when detecting that an output current inflows from the output end into the power optimization module 10, the control module 30 may trigger backflow current protection. When detecting that a quantity of times of overcurrent protection triggered in a unit time segment is greater than a first threshold, or detecting that a quantity of times of backflow current protection triggered in a unit time segment is greater than a second threshold, the control module 30 may determine that the power optimization module 10 is faulty.

The unit time, the first threshold, and the second threshold may be preset fixed values, and may be adjusted according to an actual case. This is not limited in this embodiment of the present invention. For example, it is assumed that the unit time is 30 seconds, and the first threshold and the second threshold are equal to 3. When the control module 30 detects that a quantity of times of overcurrent protection triggered in 30 seconds is greater than 3, or detects that a quantity of times of backflow protection triggered in 30 seconds is greater than 3, the control module 30 may determine that the power optimization module 10 is faulty.

On the other hand, when the voltage step-down chip 111 or the voltage step-up chip 121 in the power optimization module 10 is faulty, or the power supply component 13 supplies no power, or the processing component 14 has no output, impact is caused on an output parameter of the power optimization module 10. When the detection component in the power optimization module 10 is faulty, a detection parameter reported by the detection component is abnormal. Therefore, the control module 30 may alternatively determine whether the power optimization module 10 is faulty based on the output parameter of the power optimization module 10 and the detection parameter reported by the detection component.

In this embodiment of the present invention, the control module 30 may determine that the power optimization module 10 is faulty when detecting that a voltage difference of output voltages collected by any two voltage detection components is greater than a preset voltage difference threshold, or when detecting that a temperature difference of temperatures collected by any two temperature sensors is greater than a preset temperature difference threshold, or when detecting that lasting duration for which the output parameter of the power optimization module 10 does not satisfy a normal output condition exceeds a preset duration threshold.

Referring to FIG. 4, the power optimization module 10 may include a plurality of voltage detection components 16 connected to the control module 30. At least two voltage detection components 16 are configured to: collect output voltages of the power optimization module 10, and report the collected output voltages to the control module 30. When the at least two voltage detection components 16 are in normal working states, the output voltages collected by the at least two voltage detection components 16 should be equal. Therefore, when detecting that there is a relatively large voltage difference between the output voltages collected by any two voltage detection components 16, the control module 30 may determine that a voltage detection component is faulty. The power optimization module 10 needs to perform power optimization processing on the photovoltaic battery component based on the output voltage collected by the voltage detection component 16. Therefore, when a voltage detection component is faulty, the power optimization module 10 is caused to work abnormally, and in this case, the control module 30 may determine that the power optimization module 10 is faulty.

For example, the photovoltaic power optimizer shown in FIG. 4 is provided with two voltage detection components 16 configured to collect output voltages, and each voltage detection component 16 may include three resistors and one capacitor. The two voltage detection components 16 may separately report a collected output voltage Vfb and a collected output voltage Vovp to the control module 30. If detecting that a voltage difference between the output voltage Vfb and the output voltage Vovp is greater than a preset voltage difference threshold (for example, 5 V), the control module 30 may determine that the power optimization module 10 is faulty, and cause the bypass module 20 to be on. The preset voltage difference threshold may be set based on a capacitance difference and a surplus capacity of output voltages when the power optimization module 10 works normally.

Further, as shown in FIG. 4, the temperature detection component 15 in the power optimization module 10 may include at least two temperature sensors 150. The at least two temperature sensors 150 are configured to: collect temperatures of the photovoltaic power optimizer, and report the collected temperatures to the control module 30. When each temperature sensor is in a normal working state, the temperatures collected by the plurality of temperature sensors should be the same. Therefore, when the control module 30 detects that a temperature difference of temperatures collected by any two temperature sensors is greater than a preset temperature difference threshold, the control module 30 may determine that a temperature sensor is faulty. The control module 30 further needs to perform over-temperature protection on the power optimization module 10 based on the temperature collected by the temperature sensor. Therefore, when a temperature sensor is faulty, an over-temperature protection function may be caused to be invalidated, and as a result, devices in the power optimization module 10 cannot work normally. In this case, the control module 30 may determine that the power optimization module 10 is faulty.

For example, in the structure shown in FIG. 4, the temperature detection component 15 includes three temperature sensors 150. Each temperature sensor 150 includes a thermistor and a general resistor that are serially connected between the negative input end and a reference voltage end Vref. For example, the second temperature sensor includes a thermistor Rt2 and a general resistor R2 that are serially connected. It may be learned from FIG. 4 that, temperatures reported by the three temperature sensors 150 to the control module 30 may be t1 to t3 respectively. When detecting that a temperature difference of any two of the three temperatures t1 to t3 is greater than a preset temperature difference threshold (for example, 30 degrees), the control module 30 may determine that a fault occurs. The preset temperature difference threshold may be set based on a capacitance difference and a surplus capacity of working temperatures when the power optimization module 10 works normally.

Further, in a working process of the photovoltaic power optimizer, the control module 30 may further detect in real time whether the output parameter of the power optimization module 10 satisfies a normal output condition. The output parameter may include an output current and an output voltage. Correspondingly, the control module 30 may detect the output current by using the current detection component 17, and detect the output voltage by using the voltage detection component 16. The normal output condition may include that: the output current falls within a preset output current range, and the output voltage falls within a preset output voltage range. Affected by an external environment and a fluctuating input voltage of the photovoltaic battery component, the photovoltaic power optimizer may have a fluctuating output parameter. To ensure accuracy of identifying a fault by the control module 30, the control module 30 may determine that the power optimization module 10 is faulty only when detecting that lasting duration for which the output parameter does not satisfy the normal output condition exceeds a preset duration threshold.

For example, it is assumed that the preset output current range is greater than or equal to 1 ampere (A), the preset output voltage range is greater than or equal to 2 volts (V), and the preset duration threshold is 60 seconds. When the control module 30 detects that the output voltage of the power optimization module 10 is less than 2 V, the output current is less than 1 A, and the output state lasts for more than 60 seconds, the control module 30 may determine that the power optimization module 10 is faulty.

When some devices in the power optimization module 10 are faulty, alarm reminding such as overcurrent protection or backflow current protection is not triggered. In this case, by detecting the output parameter of the power optimization module 10, the control module 30 can effectively detect whether the power optimization module 10 is faulty, to cause the bypass module 20 to be on in time.

Optionally, when detecting that the power optimization module 10 is faulty, alternatively, the control module 30 may first turn off the power components (for example, the voltage step-down component 11 and the voltage step-up component 12) in the power optimization module 10, and then cause the bypass module 20 to be on. Then, the control module 30 may further continue to detect an input voltage of the photovoltaic battery component, and when detecting that the input voltage of the photovoltaic battery component is less than a preset low voltage threshold, the control module 30 may determine that the input voltage of the photovoltaic battery component is excessively low and the photovoltaic battery component cannot output power normally. To avoid impact caused by the photovoltaic battery component on power output by other battery groups, the control module 30 may control the bypass module 20 to be off. Then, the control module 30 may turn on the power components in the power optimization module 10, and continue to detect whether the power optimization module 10 is faulty.

Further, to ensure normal serial connections of the other battery groups, as shown in FIG. 4, the photovoltaic power optimizer may further be provided with a bypass component 50. The bypass component 50 may include a transistor T0, a gate of the transistor T0 is connected to the control module 30, a first electrode of the transistor T0 is connected to a positive output end of the power optimization module 10, and a second electrode of the transistor T0 is connected to a negative output end of the power optimization module 10. When the control module 30 detects that the power optimization module 10 is faulty, and the input voltage of the photovoltaic battery component is less than the preset low voltage threshold, the control module 30 may control the transistor T0 in the bypass component 50 to be on. In this case, both the photovoltaic battery component and the power optimization module 10 are bypassed, the other battery groups continue to remain in a serially-connected state, and the photovoltaic power generation system can work normally.

Optionally, in this embodiment of the present invention, the control module 30 may further be configured to: when any transistor in the voltage step-down component 11 is short-circuited, turn off the other transistor in time; and when any transistor in the voltage step-up component 12 is short-circuited, turn off the other transistor in time. Referring to FIG. 6, it may be learned that, when any transistor in the voltage step-down component 11 or the voltage step-up component 12 is short-circuited, the short-circuit fault may cause impact on the other devices in the power optimization module 10, so that when the control module 30 turns off the other transistor in the component in time, the control module 30 can disconnect a connection between the short-circuited transistor and the other devices, thereby effectively avoiding diffusion of the short-circuit fault.

Optionally, in this embodiment of the present invention, the photovoltaic power optimizer may further include a host computer; and the control module 30 establishes a communication connection with the host computer, and may, for example, establish the communication connection by using a wired network or a wireless network. The control module 30 may be configured to:

send a bypass channel switching request to the host computer when detecting that the power optimization module 10 is faulty; and control the bypass module 20 to be on when receiving a switching instruction sent by the host computer.

Optionally, the memory 40 in the photovoltaic power optimizer may be an electrically erasable programmable read-only memory (EEPROM). The processing component 14 in the power optimization module 10 may have a power line communication (PLC) modulation and demodulation function and a rectification feedback function. The power supply component 13 may include a linear voltage stabilizer 131 and a direct current to direct current (DC/DC) driving chip 132, a transistor T5, and a transformer 133. It may be learned from FIG. 4 that, an input end of the power supply component 13 is an input end of the photovoltaic power optimizer, and the power supply component 13 can supply power to various devices in the photovoltaic power optimizer when driven by a voltage provided by the photovoltaic battery component. For example, a power supply voltage of 12 V may be provided for the voltage step-down chip 111, the voltage step-up chip 121, and the processing component 14, and a power supply voltage of 3.3 V may be provided for the control module 30 and the current detection component 17. In addition, it may further be learned from FIG. 4 that, the power supply component 13 may further provide a source voltage B1-*s* and a gate voltage B1-*g* for the voltage step-down chip 111; and provide a source voltage B2-*s* and a gate voltage B2-*g* for the voltage step-up chip 121.

Optionally, referring to FIG. 4, it may be learned that a topological structure of the photovoltaic power optimizer provided in this embodiment of the present invention is a non-isolated topological structure. The bypass module 20 in the power optimizer may be disposed between a positive input end and a positive output end (that is, disposed on a power main line), as shown in FIG. 4. Alternatively, the bypass module 20 may be disposed between a negative input end and a negative output end (that is, disposed on a power GND line).

In conclusion, this embodiment of the present invention provides the photovoltaic power optimizer. When detecting that the power optimization module is faulty, the control module in the photovoltaic power optimizer can cause the bypass module to be on, to bypass the faulty power optimization module, so that the photovoltaic battery component can be directly serially connected to the other battery groups in the photovoltaic power generation system, and connected to an input end of the inverter. In this way, power generated by the photovoltaic battery component can be effectively output, thereby avoiding a waste of power caused by the faulty power optimization module.

Figure 7:
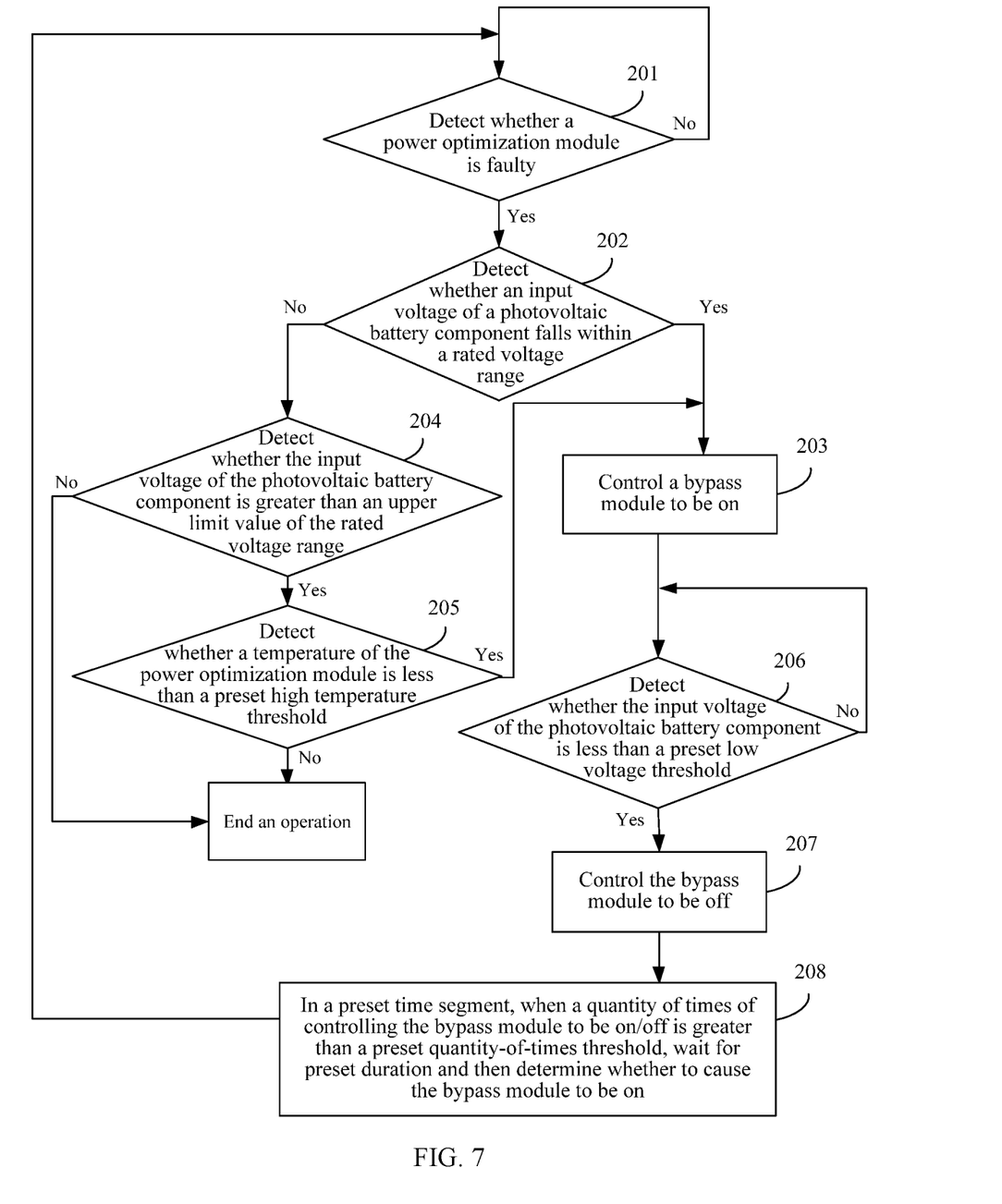
FIG. 7 is a flowchart of a method for controlling a photovoltaic power optimizer according to an embodiment of the present invention.

FIG. 7 is a flowchart of a method for controlling a photovoltaic power optimizer according to an embodiment of the present invention. The method is used to control the photovoltaic power optimizer shown in FIG. 2 or FIG. 4, and the method may be applied to the control module 30 in the photovoltaic power optimizer. Referring to FIG. 7, the method may include the following steps.

Step 201. Detect whether a power optimization module is faulty.

When it is detected that the power optimization module 10 is faulty, step 202 is performed; and when it is not detected that the power optimization module 10 is faulty, step 201 is performed, that is, fault detection is performed at a preset detection period.

In an optional implementation, the process of detecting, by the control module 30, whether the power optimization module 10 is faulty may include:

counting a quantity of times of overcurrent protection and a quantity of times of backflow current protection triggered in a unit time segment; and determining that the power optimization module 10 is faulty when detecting that the quantity of times of overcurrent protection triggered in the unit time segment is greater than a first threshold, or the quantity of times of backflow current protection triggered in the unit time segment is greater than a second threshold.

In another optional implementation, the process of detecting, by the control module 30, whether the power optimization module 10 is faulty may include:

obtaining a detection parameter and an output parameter of the power optimization module 10, where the detection parameter includes output voltages collected by at least two voltage detection components and temperatures collected by at least two temperature sensors; and determining that the power optimization module 10 is faulty when detecting that a voltage difference of output voltages collected by any two voltage detection components is greater than a preset voltage difference threshold, or when detecting that a temperature difference of temperatures collected by any two temperature sensors is greater than a preset temperature difference threshold, or when detecting that lasting duration for which the output parameter of the power optimization module 10 does not satisfy a normal output condition exceeds a preset duration threshold.

For example, the control module 30 may count in real time a quantity of times of triggered overcurrent protection, and a quantity of times of triggered backflow current protection; and the control module 30 may obtain in real time the output parameter of the power optimization module 10 and the detection parameter collected by each detection component, to detect whether the power optimization module 10 is faulty based on counted and obtained data.

For an implementation process of step 201, refer to related descriptions of the apparatus embodiments, and details are not described herein again.

Step 202. Detect whether an input voltage of the photovoltaic battery component falls within a rated voltage range.

The rated voltage range may be a range of voltages that can be provided when the photovoltaic battery component works normally. For example, the rated voltage range may be 12 V to 60 V. When the input voltage of the photovoltaic battery component falls within the rated voltage range, step 203 is performed; or when the input voltage of the photovoltaic battery component does not fall within the rated voltage range, step 204 is performed.

For example, as shown in FIG. 4, the power optimization module 10 may further be provided with a voltage detection component 16 configured to collect an input voltage Vin. An input end of the voltage detection component 16 is connected to an input end IN of the photovoltaic power optimizer. The input end IN is configured to: collect the input voltage Vin of the photovoltaic battery component, and report the collected input voltage Vin to the control module 30.

Step 203. Control the bypass module to be on and perform step 206.

When the input voltage of the photovoltaic battery component falls within the rated voltage range, the control module 30 may determine that the photovoltaic battery component can work normally at this time. To avoid a waste of power, the control module 30 may control the bypass module 20 to be on, so that the photovoltaic battery component is directly serially connected to other battery groups in a photovoltaic power generation system, to ensure that power generated by the photovoltaic battery component can be output normally.

Step 204. Detect whether the input voltage of the photovoltaic battery component is greater than an upper limit value of the rated voltage range.

When the input voltage of the photovoltaic battery component does not fall within the rated voltage range, the control module 30 may further detect whether the input voltage is greater than the upper limit value of the rated voltage range. When the input voltage of the photovoltaic battery component is greater than the upper limit value of the rated voltage range, step 205 is performed. When the input voltage of the photovoltaic battery component is not greater than the upper limit value of the rated voltage range, that is, the input voltage of the photovoltaic battery component is less than a lower limit value of the rated voltage range, the control module 30 may determine that the input voltage of the photovoltaic battery component is excessively low and the photovoltaic battery component cannot output power normally. Therefore, an operation can be ended, that is, the bypass module 20 remains in an OFF state.

Step 205. Detect whether a temperature of the power optimization module is less than a preset high temperature threshold.

In an extreme scenario, for example, a scenario in which an output end is short-circuited, there is a risk of damaging devices in the bypass module 20 to be on at a high voltage and a high temperature. Therefore, when the control module 30 detects that the input voltage of the photovoltaic battery component is excessively high, to decrease a damage rate of the devices in the bypass module 20, the control module 30 may further detect a temperature of the power optimization module 10.

When detecting that the temperature of the power optimization module 10 is less than the preset high temperature threshold, the control module 30 may determine that a current ambient temperature of the bypass module 20 is relatively low, and the bypass module 20 can work normally in a high voltage environment. Therefore, step 203 may be performed, that is, the bypass module 20 is controlled to be on. When the temperature of the power optimization module 10 is not less than the preset high temperature threshold, the control module 30 may determine that the temperature of the current power optimization module 10 is excessively high, and if the bypass module 20 is on, the devices in the bypass module 20 may be invalidated in a high-temperature and high-voltage environment. In this case, the control module 30 may end an operation, that is, maintain the bypass module 20 to be in the OFF state.

The preset high temperature threshold may be set based on high temperature-resistant performance of the devices in the bypass module 20. For example, the preset high temperature threshold may be 55 degrees.

Optionally, in this embodiment of the present invention, when detecting that the power optimization module 10 is faulty, to reduce power consumption, the control module 30 may further turn off the power components in the power optimization module 10, for example, may turn off the voltage step-up component 12 and the voltage step-down component 11.

Still referring to FIG. 7, after controlling the bypass module 20 to be on, the control module 30 may further continue to perform the following operations.

Step 206. Detect whether the input voltage of the photovoltaic battery component is less than a preset low voltage threshold.

In this embodiment of the present invention, the low voltage threshold may be less than the lower limit value of the rated voltage range. When the input voltage of the photovoltaic battery component is less than the preset low voltage threshold, the control module 30 may perform step 207. When the input voltage of the photovoltaic battery component is not less than the preset low voltage threshold, the control module 30 may determine that the photovoltaic battery component can work normally, and therefore, may perform step 206, that is, continue to detect the input voltage of the photovoltaic battery component.

Step 207. Control the bypass module to be off.

When the input voltage of the photovoltaic battery component is less than the preset low voltage threshold, the control module 30 may determine that the input voltage of the photovoltaic battery component is excessively low, and power cannot be output normally. To avoid impact caused by the photovoltaic battery component on power output by the other battery groups, the control module 30 may control the bypass module 20 to be off. Then, the control module 30 may continue to detect whether the power optimization module 10 is faulty.

Optionally, if the control module 30 further turns off the power components in the power optimization module 10 after detecting that the power optimization module 10 is faulty, when the control module 30 controls the bypass module 20 to be off, the control module 30 may turn on the power components in the power optimization module 10 again, and continue to perform step 207, that is, detect whether the power optimization module 10 is faulty at a preset detection period.

Step 208. In a preset time segment, when a quantity of times of controlling the bypass module to be on/off is greater than a preset quantity-of-times threshold, wait for preset duration and then determine whether to cause the bypass module to be on.

In this embodiment of the present invention, when the input voltage of the photovoltaic battery component greatly fluctuates, or the photovoltaic battery component is covered by an external object, or the photovoltaic battery component is damaged, a current of the photovoltaic battery component cannot support a current level after the components are serially connected (serially connected). In this case, the control module 30 may frequently cause the bypass module 20 to be on or off, and the bypass module 20 cannot be successfully caused to be on. When the control module 30 detects that a quantity of times of controlling the bypass module 20 to be on/off within a preset time segment is greater than a preset quantity-of-times threshold, to prevent performance of the devices in the bypass module 20 from being affected due to frequent on/off of the bypass module 20, the control module 30 may wait until serially connected power decreases (that is, the current decreases) and then determine whether to cause the bypass module 20 to be on. In other words, the control module 30 may wait for preset duration and then continue to perform step 201, until the bypass module 20 is successfully caused to be on.

For example, it is assumed that the preset time segment is three minutes, and the preset quantity-of-times threshold is six. When detecting that a quantity of times of controlling the bypass module 20 to be on/off within the three minutes is greater than six, the control module 30 may determine that the bypass module 20 is not suitable to be switched. Therefore, the control module 30 may wait for 10 minutes and then re-determine whether to cause the bypass module 20 to be on.

In conclusion, this embodiment of the present invention provides the method for controlling a photovoltaic power optimizer. According to the method, when it is detected that the power optimization module is faulty, the bypass module can be caused to be on, to bypass the faulty power optimization module, so that the photovoltaic battery component can be directly serially connected to the other battery groups in the photovoltaic power generation system, and connected to an inverter. In this way, power generated by the photovoltaic battery component can be effectively output, thereby avoiding a waste of power caused by the faulty power optimization module.

Figure 8:
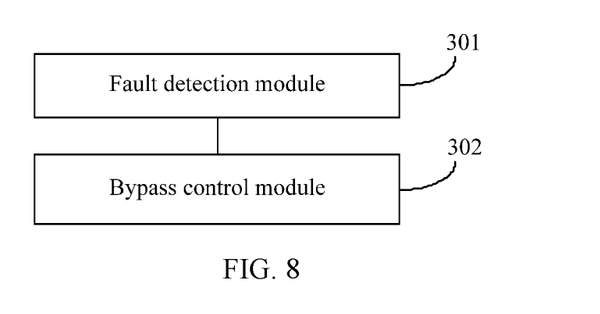
FIG. 8 is a schematic structural diagram of an apparatus for controlling a photovoltaic power optimizer according to an embodiment of the present invention.

FIG. 8 is a schematic structural diagram of an apparatus for controlling a photovoltaic power optimizer according to an embodiment of the present invention. The apparatus may be configured in a control module 30 of a photovoltaic power optimizer. As shown in FIG. 8, the apparatus may include:

a fault detection module 301, configured to detect whether a power optimization module is faulty; and a bypass control module 302, configured to control a bypass module to be on when it is detected that the power optimization module is faulty.

Optionally, the fault detection module 301 may be configured to:

count a quantity of times of overcurrent protection and a quantity of times of backflow current protection triggered in a unit time segment; and determine that the power optimization module is faulty when detecting that the quantity of times of overcurrent protection triggered in the unit time segment is greater than a first threshold, or the quantity of times of backflow current protection triggered in the unit time segment is greater than a second threshold.

Optionally, the fault detection module 301 may be configured to:

obtain a detection parameter and an output parameter of the power optimization module, where the detection parameter includes output voltages collected by at least two voltage detection components and temperatures collected by at least two temperature sensors; and determine that the power optimization module is faulty when detecting that a voltage difference of output voltages collected by any two voltage detection components is greater than a preset voltage difference threshold, or when detecting that a temperature difference of temperatures collected by any two temperature sensors is greater than a preset temperature difference threshold, or when detecting that lasting duration for which the output parameter of the power optimization module does not satisfy a normal output condition exceeds a preset duration threshold.

Optionally, the bypass control module 302 may be configured to perform the method shown in step 202 to step 207 in the foregoing method embodiment.

Optionally, the bypass control module 302 may further be configured to perform the method shown in step 208 in the foregoing method embodiment.

Optionally, the bypass control module 302 is configured to: send a bypass channel switching request to a host computer when detecting that the power optimization module is faulty; and control the bypass module to be on when receiving a switching instruction sent by the host computer.

In conclusion, this embodiment of the present invention provides the apparatus for controlling a photovoltaic power optimizer. According to the apparatus, when it is detected that the power optimization module is faulty, the bypass module can be caused to be on, to bypass the faulty power optimization module, so that the photovoltaic battery component can be directly serially connected to other battery groups in a photovoltaic power generation system, and connected to an inverter. In this way, power generated by the photovoltaic battery component can be effectively output, thereby avoiding a waste of power caused by the faulty power optimization module.

The methods provided in the foregoing embodiments may be fully or partially implemented by software, hardware, firmware, or any combination thereof. When the methods are implemented by using software, the methods may be fully or partially implemented in a form of a computer program product, and the computer program product includes one or more computer instructions. When the computer program instructions are loaded and executed on the computer, the procedure or functions according to the embodiments of the present invention are all or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, a semiconductor medium (for example, a solid-state drive), or the like.

What is claimed is:

1. A photovoltaic power optimizer, comprising: a power optimization module, a bypass module, and a control module, wherein an input end of the power optimization module is connected to a photovoltaic battery component, an output end of the power optimization module is connected to an inverter, and the power optimization module is configured to optimize power output by the photovoltaic battery component;

the bypass module is connected directly to the input end of the power optimization module, the output end of the power optimization module, and the control module, and the control module is further connected to the power optimization module, the bypass module configured to bypass the power optimization module by directly connecting the input end of the power optimization module to the output end of the power optimization module; and the control module is configured to detect whether the power optimization module is faulty, and in response to detecting that the power optimization is faulty:

detect whether an input voltage of the photovoltaic battery component falls within a rated voltage range, in response to the input voltage of the photovoltaic battery component falling within the rated voltage range, controlling the bypass module to be on, and in response to the input voltage of the photovoltaic battery component being greater than the rated voltage range, controlling the bypass module based on a detected temperature of the power optimization module.

2. The photovoltaic power optimizer according to claim 1, wherein the bypass module comprises a transistor; and a gate of the transistor is connected to the control module, a first electrode of the transistor is connected to the input end of the power optimization module, and a second electrode of the transistor is connected to the output end of the power optimization module.

3. The photovoltaic power optimizer according to claim 2, wherein the transistor is a metal-oxide semiconductor field-effect transistor (MOSFET), and the bypass module further comprises a diode serially connected to the transistor; and
conduction directions of the diode and a parasitic diode in the MOSFET are opposite.

4. The photovoltaic power optimizer according to claim 1, wherein the bypass module comprises a plurality of serially-connected transistors, wherein
a gate of each transistor in the plurality of serially-connected transistors is connected to the control module;
in the plurality of serially-connected transistors, a first electrode of a first transistor is connected to the input end of the power optimization module, and a second electrode of a second transistor is connected to the output end of the power optimization module; and
the first transistor and the second transistor are transistors located at two ends of the at least two serially-connected transistors.

5. The photovoltaic power optimizer according to claim 3, wherein each transistor in the plurality of serially-connected transistors is a metal-oxide semiconductor field-effect transistor (MOSFET); and
conduction directions of parasitic diodes in at least two of the plurality of serially-connected transistors are opposite.

6. The photovoltaic power optimizer according to claim 1, wherein the control module is further configured to:
detect whether the input voltage of the photovoltaic battery component is less than a preset low voltage threshold; and
when the input voltage of the photovoltaic battery component is less than the preset low voltage threshold, control the bypass module to be off.

7. The photovoltaic power optimizer according to claim 1, wherein the power optimization module comprises a voltage step-down component and a voltage step-up component; the voltage step-down component comprises a voltage step-down chip and two transistors; and the voltage step-up component comprises a voltage step-up chip and two transistors; and
the control module is further configured to: when detecting that any one of the two transistors in the voltage step-down component is short-circuited, turn off the other one of the two transistors in the voltage step-down component; and when detecting that any one of the two transistors in the voltage step-up component is short-circuited, turn off the other one of the two transistors in the voltage step-up component.

8. The photovoltaic power optimizer according to claim 1, wherein the photovoltaic power optimizer further comprises a host computer; and
the control module establishes a communication connection with the host computer, and the control module is configured to:
send a bypass channel switching request to the host computer when detecting that the power optimization module is faulty; and
control the bypass module to be on when receiving a switching instruction sent by the host computer.

9. A photovoltaic power generation system, comprising:
a plurality of serially-connected battery groups, wherein each battery group in the plurality of serially-connected battery groups comprises a respective photovoltaic power optimizer according to claim 1 and a respective photovoltaic battery component connected to the corresponding photovoltaic power optimizer.

10. A method for controlling a photovoltaic power optimizer,
wherein the photovoltaic power optimizer comprises: a power optimization module, a bypass module, and a control module, wherein
an input end of the power optimization module is connected to a photovoltaic battery component, an output end of the power optimization module is connected to an inverter, and the power optimization module is configured to optimize power output by the photovoltaic battery component;
the bypass module is connected directly to the input end of the power optimization module, the output end of the power optimization module, and the control module, and the control module is further connected to the power optimization module, the bypass module configured to bypass the power optimization module by directly connecting the input end of the power optimization module to the output end of the power optimization module; and
the control module is configured to control the bypass module;
wherein the method comprises:
detecting whether the power optimization module is faulty, and in response to detecting that the power optimization is faulty:
detecting whether an input voltage of the photovoltaic battery component falls within a rated voltage range,
in response to the input voltage of the photovoltaic battery component falling within the rated voltage range, controlling the bypass module to be on, and
in response to the input voltage of the photovoltaic battery component being greater than the rated voltage range, controlling the bypass module based on a detected temperature of the power optimization module.

11. The method according to claim 10, wherein the detecting whether the power optimization module is faulty comprises:
counting a number of times of overcurrent protection and a number of times of backflow current protection triggered in a unit time segment; and
determining that the power optimization module is faulty when detecting that the number of times of overcurrent protection triggered in the unit time segment is greater than a first threshold, or the number of times of backflow current protection triggered in the unit time segment is greater than a second threshold.

12. The method according to claim 10, wherein the detecting whether the power optimization module is faulty comprises:
obtaining a detection parameter and an output parameter of the power optimization module, wherein the detection parameter comprises output voltages collected by at least two voltage detection components and temperatures collected by at least two temperature sensors; and
determining that the power optimization module is faulty when detecting that a voltage difference of output voltages collected by any two voltage detection components is greater than a preset voltage difference threshold, or when detecting that a temperature difference of temperatures collected by any two temperature sensors is greater than a preset temperature difference threshold, or when detecting that a lasting duration for which the output parameter of the power optimization module does not satisfy a normal output condition exceeds a preset duration threshold, wherein the normal output condition includes that an output current falls within a preset output current range, and an output voltage falls within a preset output voltage range.

13. The method according to claim 10, wherein the rated voltage range is a range of voltages that are provided when the photovoltaic battery component works normally.

14. The method according to claim 13, wherein controlling the bypass module based on the detected temperature of the power optimization module comprises:

detecting whether the temperature of the power optimization module is less than a preset high temperature threshold; and controlling the bypass module to be on when the temperature of the power optimization module is less than the preset high temperature threshold.

15. The method according to claim 10, wherein after the controlling the bypass module to be on, the method further comprises:

detecting whether an input voltage of the photovoltaic battery component is less than a preset low voltage threshold; and when the input voltage of the photovoltaic battery component is less than the preset low voltage threshold, controlling the bypass module to be off.

16. The method according to claim 15, wherein the method further comprises:

in a preset time segment, when a number of times of controlling the bypass module to be on/off is greater than a preset number-of-times threshold, waiting fora preset duration and then determining whether to cause the bypass module to be on.

17. The method according to claim 10, wherein the controlling the bypass module to be on when detecting that the power optimization module is faulty comprises:

sending a bypass channel switching request to a host computer when detecting that the power optimization module is faulty; and controlling the bypass module to be on when receiving a switching instruction sent by the host computer.

18. A non-transitory computer storage medium, wherein the computer-readable storage medium stores an instruction, and when the computer-readable storage medium is run on a computer, the computer is enabled to perform the method for controlling a photovoltaic power optimizer according to claim 10.

19. An apparatus for controlling a photovoltaic power optimizer, comprising:

a memory comprising instructions; and one or more processors coupled to the memory;

wherein the photovoltaic power optimizer comprises: a power optimization module, and a bypass module, wherein an input end of the power optimization module is connected to a photovoltaic battery component, an output end of the power optimization module is connected to an inverter, and the power optimization module is configured to optimize power output by the photovoltaic battery component; wherein the bypass module is connected directly to the input end of the power optimization module, the output end of the power optimization module, and the one or more processors, and the one or more processors is further connected to the power optimization module, the bypass module configured to bypass the power optimization module by directly connecting the input end of the power optimization module to the output end of the power optimization module;

wherein the instructions cause the one or more processors to be configured to:

detect whether the power optimization module is faulty, and in response to detecting that the power optimization is faulty:

detect whether an input voltage of the photovoltaic battery component falls within a rated voltage range, in response to the input voltage of the photovoltaic battery component falling within the rated voltage range, controlling the bypass module to be on, and in response to the input voltage of the photovoltaic battery component being greater than the rated voltage range, controlling the bypass module based on a detected temperature of the power optimization module.

* * * * *